No. 871,956. PATENTED NOV. 26, 1907.
R. RICE.
STOP COCK.
APPLICATION FILED OCT. 3, 1904.
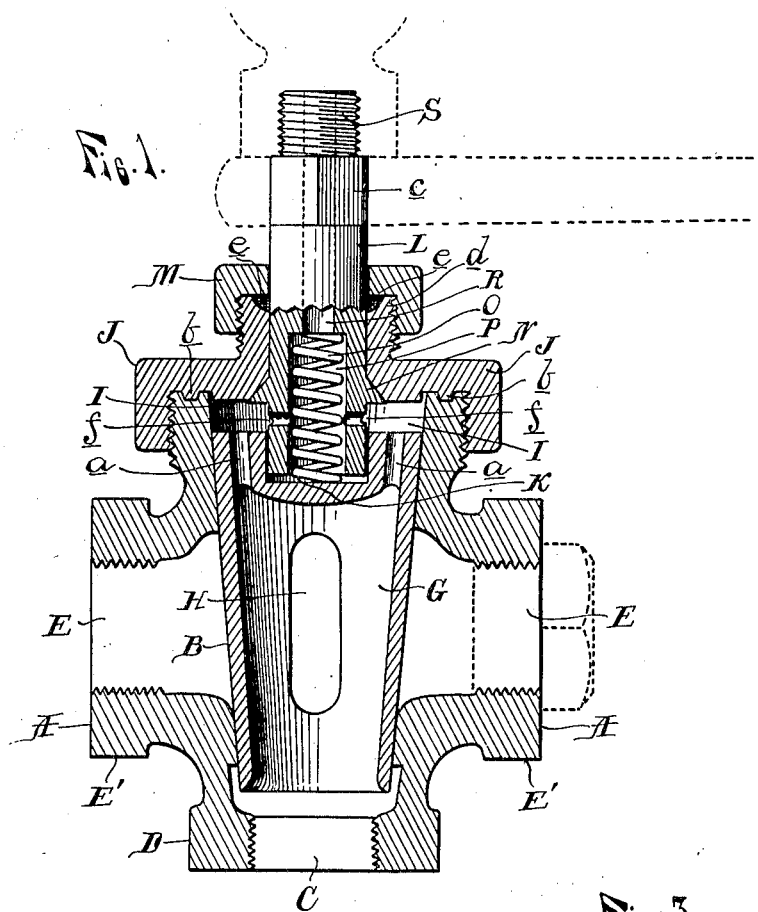
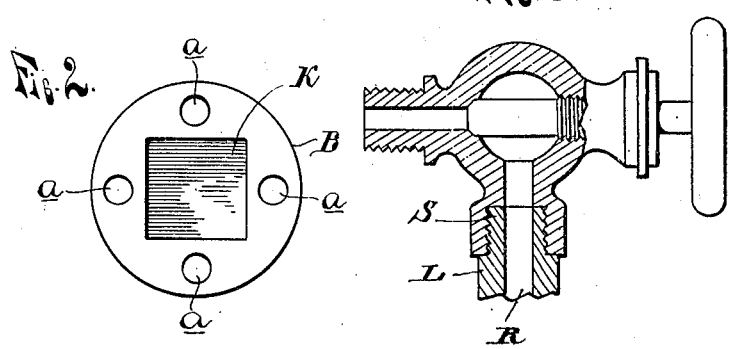
WITNESSES. INVENTOR.

UNITED STATES PATENT OFFICE.

ROBERT RICE, OF DETROIT, MICHIGAN, ASSIGNOR OF ONE-HALF TO GEORGE STROH, OF DETROIT, MICHIGAN.

STOP-COCK.

No. 871,956.    Specification of Letters Patent.    Patented Nov. 26, 1907.

Application filed October 3, 1904. Serial No. 226,885.

*To all whom it may concern:*

Be it known that I, ROBERT RICE, a citizen of the United States of America, residing at Detroit, in the county of Wayne and State of Michigan, have invented certain new and useful Improvements in Stop-Cocks, of which the following is a specification, reference being had therein to the accompanying drawings.

This invention relates to that class of stop cocks especially designed for use in connection with pressure appliances as for instance as a blow-off for boilers or throttle valve for engines etc., and the object of the invention is to produce a stop cock for these purposes which is not liable to leak or become leaky under any pressure or contingencies of use, and which at the same time can be opened and closed without the expenditure of much power, all of which I obtain by the construction more fully hereinafter described and shown in the accompanying drawings, in which Figure 1 is a central section through the stop cock, and Fig. 2, is a top plan of the plug. Fig. 3 is a vertical section through the upper end of the valve stem.

A is the casing formed with a frusto-conical plug chamber in which is seated the hollow tapered rotary plug B. The casing is provided in the axis of the plug with an inlet opening C formed through a suitable coupling arm D at the smaller end of the plug and with one or more outlet openings E formed by like coupling arms E' at right angles to the axis of the plug. The interior chamber G of the plug is open to the inlet, and is adapted to connect the same through a lateral opening H in the wall of the plug with either one of the outlets shown. The plug is shorter than the chamber in which it is seated which leaves at the larger end of the plug a pressure chamber I which communicates with the chamber in the plug and thereby with the inlet through ports $a$ formed through the closed end of the plug.

The top of the plug chamber is formed by a cap J which is connected to the valve casing by screw threads as shown, but may be secured to the casing by bolts in the larger sizes of the cock and a pressure tight joint is formed by means of an annular flange $b$ projecting from the underside of the cap and fitting tightly into a corresponding groove in the casing. The plug is formed in its closed end with a square recess K for engagement with the stem L which has a correspondingly squared inner end to fit into the recess and a squared outer end $c$ to receive a suitable lever or other turning device.

The stem passes through a packing-gland $d$ formed on the cap and adapted to receive a packing $e$ which is held in place by a packing nut M. Another steam tight joint is formed around the stem by means of a projecting bevel flange N encircling the stem and seated upon a corresponding bevel seat on the underside of the cap around the stem by the tension of a coil spring O inclosed within a recess P in the inner end of the stem, the flange N and its seat being ground to fit each other and form a pressure tight joint.

The recess P in the stem is provided with ports $f$ through which it communicates with the chamber I on top of the plug and a passage R leads from the recess to the outer end of the stem and forms a secondary outlet. This outlet may be utilized for different purposes according to the specific use to which the stop cock may be put to. In using it as a boiler blow-off cock, I attach a common pet cock to the outlet as shown in dotted lines in the drawings by providing the stem with an externally screw-threaded nipple S, which permits of blowing off any mud or gritty substance which may have accumulated in the passages of the cock thereby preventing it from grinding out the plug or its seat in operating the cock. If not used for this or any other purpose it may readily be closed by a screw cap and any other unused outlet from the casing may be provided with a screw-plug, as shown in dotted lines.

It will be understood that the pressure of the fluid on the valve plug is the same on the upper and lower side thereof whether the cock is closed or not. The pressure of the fluid is thus no factor at all in the seating of the valve and the force which holds it to its seat depends wholly on the tension of the spring and on the weight of the plug and it turns therefore just as easy with high as with low pressure. The tension of the spring which is fixed need only be sufficient to keep the plug to its seat at the different angles or positions in which it may be used and may be omitted if the plug is only used in vertical position, the tension of the spring is thus a small factor in considering the force required for turning the valve plug.

Since the valve plug is seated on a taper seat and is separate from the stem it will always be tight on its seat and remain tight as the spring takes up the wear on the seat. The stem is seated by the pressure of the fluid and the packing gland on the stem is used for additional safety only and it can be repacked while the pressure is on the valve. In its use as a blow-off the stop cock would soon become inoperative from the mud and sediment from the water or from the boiler compounds used in boilers to prevent incrustations. These will tightly pack into the pressure chamber and also get into the joints between the casing and valve plug and prevent it from turning. By providing the pressure chamber with a blow-off I provide means for readily removing the obstructions and in connection therewith I leave a small clearance between the top of the valve and the inner end of the stem, thus if the pet cock on top of the stem is opened, the pressure can slightly raise the plug from its seat and thus all the sediment and grit which may cause the plug to stick in its seat is also blown out.

Having thus fully described my invention, what I claim is:—

1. A stop cock having a facing formed with a frusto-conical seat chamber provided with an inlet at the small end of said chamber and with a lateral outlet therefrom, a hollow conical valve plug seated in said chamber, and provided with corresponding inlet and outlet openings the seat chamber extending above the valve plug and forming a pressure chamber on the top thereof, the top being closed and provided with a socket and a valve stem extending through the casing and the pressure chamber into the socket of the valve plug and loosely engaging therewith, said valve stem being hollow and separate from the valve plug and communicating with the pressure chamber through openings in the stem and the pressure chamber communicating with the interior of the valve plug through openings in the top thereof.

2. A stop cock having a facing formed with a frusto-conical seat chamber, a hollow conical valve plug in said chamber and provided with an inlet into its smaller end communicating with the inlet into the casing and with a lateral outlet adapted to register with a lateral outlet from the casing, said valve plug seated in the seat chamber independently of its stem and with the seat chamber extending above the valve plug and forming a pressure chamber on top thereof and means for blowing off through said pressure chamber, the pressure chamber being in communication with the interior of the valve plug.

3. In a stop cock, the combination with the casing having a frusto-conical seat chamber provided with an inlet into the small end of the chamber and with a lateral outlet therefrom, a hollow conical valve plug seated in said chamber and provided with a corresponding inlet and outlet, the seat chamber extending above the valve plug and forming a pressure chamber on top thereof and communicating with the interior of the valve plug, a separate valve stem extending through the casing and pressure chamber into the top of the plug, said top provided with a socket into which the valve stem loosely engages and a coil spring inclosed in a recess in the inner end of the valve stem said valve stem provided with a valve controlled passage therethrough communicating with the pressure chamber on the top of the valve plug for the purpose specified.

In testimony whereof I affix my signature in presence of two witnesses.

ROBERT RICE.

Witnesses:
  OTTO F. BARTHEL,
  THOMAS G. LONGSTAFF.